Aug. 22, 1933.　　　E. F. FISHER　　　1,923,083
HEATING APPARATUS
Filed March 13, 1930
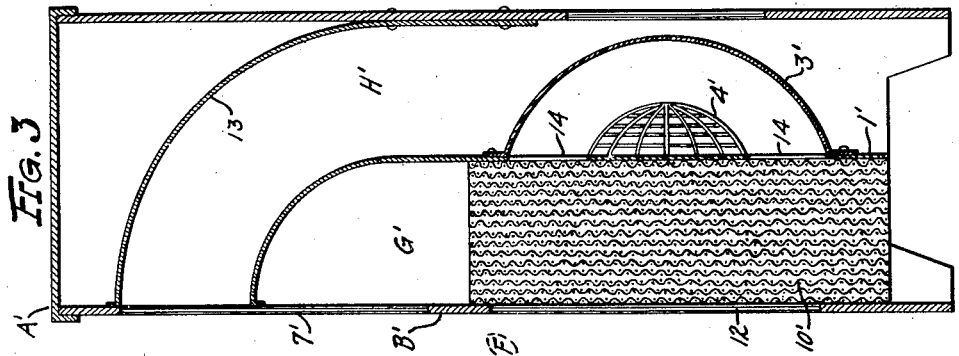
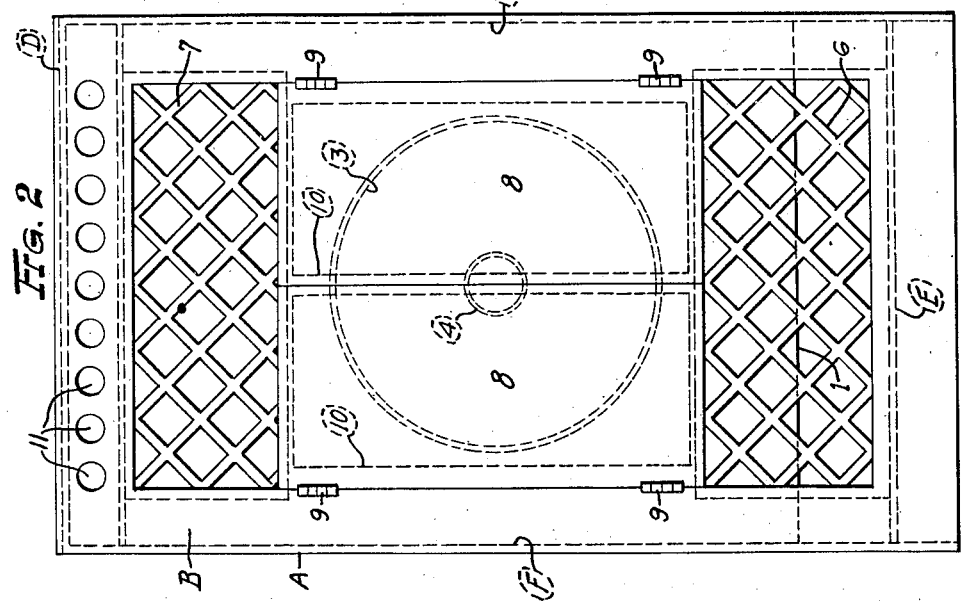
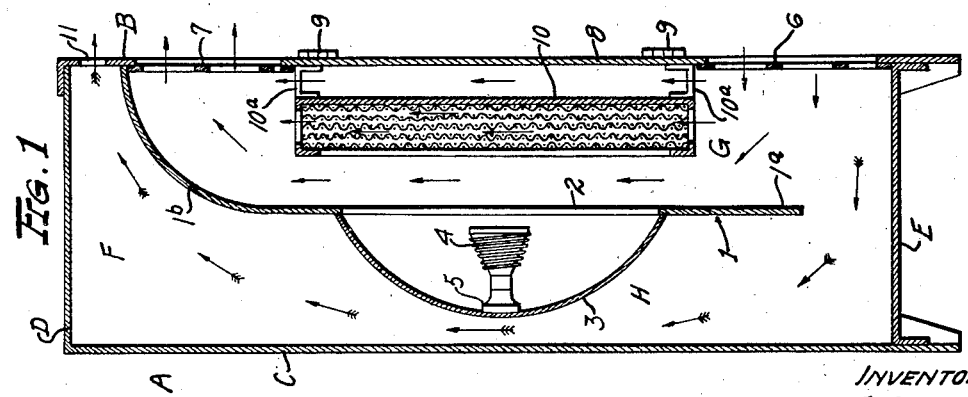
INVENTOR
E. F. FISHER
By J. T. S. Cook
ATTORNEY Patented Aug. 22, 1933

1,923,083

UNITED STATES PATENT OFFICE 1,923,083

HEATING APPARATUS

Ernest F. Fisher, St. Louis, Mo.

Application March 13, 1930. Serial No. 435,453

11 Claims. (Cl. 219—34)

This invention relates to heating apparatus of the type which comprises means for heating air and discharging said heated air into the room or compartment in which the apparatus is located.

An important object of the invention is to provide an efficient air heater of simple design, which will function with great efficiency as a heater of circulating air, and which is so constructed that by opening certain doors forming parts of the structure same may be employed as an ordinary radiant heater.

Another important object of the invention is to provide an efficient air heater which will heat air to a high temperature and cause said heated air to be distributed through a zone of relatively great area upon being discharged from the apparatus, thereby tending to produce a uniform temperature in the room or compartment in which the apparatus is located.

Fig. 1 is a vertical section through my improved heating apparatus.

Fig. 2 is a front elevation of the heating apparatus illustrated in Fig. 1.

Fig. 3 illustrates a modified form of the invention.

I have herein illustrated my invention embodied in an air heater in which the air heating means comprises an electrically operated heating device, a heat absorber capable of absorbing luminous and non-luminous ether waves, and a reflector combined with said heating device and heat absorber in such a manner that it will intercept and gather heat waves emanating from said heating device and project said heat waves onto the heat absorber. I wish it to be understood, however, that the heater may be equipped with various other types and kinds of air heating means without departing from the spirit of my invention.

Referring to Figs. 1 and 2 of the drawing, which illustrate the preferred form of my invention, A designates a casing or housing of any suitable shape and dimensions, said casing comprising a front wall B, as well as rear, top, bottom, and side walls designated, respectively, by the reference characters C, D, E, and F. Arranged within the casing A is a partition or wall 1, the major portion 1ª of which is disposed vertically within the casing A. The partition 1 is located in spaced relation with respect to the front wall B and the rear wall C, as shown clearly in Fig. 1 of the drawing, and the upper portion 1ᵇ of said partition is curved forwardly in a manner to cause its upper edge to contact with the inner face of the front wall B. The bottom edge of the partition 1 is spaced apart in an upward direction from the bottom wall E of the casing, and because of its arrangement within the casing, as described, the partition provides an air circulating passageway G between the partition 1 and the front wall B and an air circulating passageway H between the partition 1 and the rear wall C. The space between the lower edge of the partition 1 and the bottom wall E serves as a means of communication between the air circulating passageways G and H.

The partition is provided with an opening 2 at which a reflector 3 is arranged, said reflector, which preferably consists of a substantially concavo-convex shaped shell, being fixed by suitable means to the partition 1 at the rear face thereof so that the concave reflecting face of the reflector is exposed through the opening 2 to the air circulating passageway G. 4 designates an electrically operated heating device which, in the embodiment of the invention illustrated in Figs. 1 and 2 of the drawing, is positioned within the concavity of the reflector 3, wherein said heating device is supported by suitable means 5. The heating device may be of the type illustrated or various other types operated by electricity or other suitable mediums, and the position of the heating device with respect to the reflector may be altered, if desired.

The front wall B of the casing is provided with a grille or grating 6 located at the lower portion thereof, and a similar grille or grating 7 arranged at the upper portion of said front wall. The portion of the front wall B between the grilles 6 and 7 is comprised of one or more doors. When a pair of doors 8 is employed as illustrated in Figs. 1 and 2 of the drawing, said doors are hinged at their outer edges at 9 to the marginal portion of the front wall and meet at the approximate center of the front wall, and because of this arrangement the doors 8 may be moved to open positions in a manner to directly expose the air passageway G to the outside of the casing A.

Mounted on the doors 8 in spaced relation with respect to the inner faces thereof are heat-absorbers 10. In the form of the invention where a pair of doors 8 are employed preferably a separate absorber will be provided for each door, but if the casing of the apparatus is provided with only one door I prefer that only a single heat absorber will be employed. The heat-absorbers 10 are capable of absorbing luminous and non-luminous ether waves, and consist of any element, device, or structure which is capable of freely absorbing heat waves, and thereafter imparting said waves by conduction to air currents. In the form of the invention herein illustrated the heat-absorbers are each composed of numerous layers of screen cloth, or sheets of screening, clamped together, arranged vertically and extended transversely of the air circulating passageway G, suitable bracket 10ª being employed to support the absorbers in spaced relation with respect to the inner face of the doors 8. The heat absorbers 10 are arranged in opposed relation with respect to the reflector 3, and the heat absorbing surfaces thereof are preferably coated with a dead black paint to a better absorb the thermal radiations. Also, the reflector 3 is provided with a polished reflecting surface, and the heading device 4 is located in the focal point of said reflector so that said reflecting surface of said reflector will intercept and gather heat waves emanating from said heating device and project said heat waves onto said absorber.

The front wall B of the casing of the apparatus at a point above the upper grille 7 is provided with one or more apertures 11 formed therethrough. The drawing illustrates said apertures as comprising a row of circular openings, but if desired I may employ one elongated opening which would extend substantially the full width of the front wall, or I may employ a plurality of openings of shapes other than circular.

When the heating apparatus is in operation a stream of air passes through the lower grille 6 and moves upwardly through the air circulating passageways G and H. The stream of air moving through the passageway G, as indicated by the unfeathered arrows in Fig. 1, is heated by conduction in traveling or flowing by and around the heat absorbing 10, and some of the stream of air so flowing through the passageway G is heated by conduction from contact with the heating device 4 as said air circulates through the concavity of the reflector 3. The stream of air which flows from the upper grille 7, therefore, is heated to the desired degree and this heated air, because of the curved portion 1ᵇ of the passageway G, is discharged forwardly in a substantially horizontal direction into the room in which the heater is located. Some of the stream air which passes through the lower grille 6 moves upwardly through the air circulating passageway H as indicated by the feathered arrows in Fig. 1, and this air flows through the apertures 11 at the top of the front wall B of the casing of the heating apparatus and is discharged horizontally in the room in a plane above the air discharged from the passageway G. The air being discharged from the passageway G is highly heated, while the temperature of the air which is discharged from the passageway H is much lower than that of the first-mentioned air, hence, because of the relative arrangement of the discharge ends of said passageways G and H, the cooler air discharged from the passageway H will serve as a blanket which prevents the hotter air escaping from the passageway G from rising abruptly, thereby producing a more uniform temperature in the room due to the distribution of the highly heated air through a zone of relatively great area.

In the form of the invention illustrated in Fig. 3, the front wall of the casing A' is not provided with doors as in the preferred construction, but instead is apertured at 12. The heat absorber 10' is fixed in place at the rear face of the front wall B' so that it covers the aperture 12, and the modified structure includes a partition 1'. The lower portion of the casing A' is open and the upper portion of the partition 11' is curved forwardly to meet the rear face of the front wall B'. Also, a curved wall 13, which is arranged parallel with and in spaced relation with respect to the forwardly curved upper portion of the partition 1', is secured in place by having its opposite end portions fixed to the front and rear walls of the casing A'. The structure illustrated in Fig. 3 includes a reflector 3' and a suitable heating device 4', the partition 1' being apertured at 14. The front wall B' is provided with a suitable grille 7' in its upper portion, which serves as outlets for an air circulating passageway G' and an air circulating passageway H'.

In the use of a heating apparatus constructed as illustrated in Fig. 3, a stream of air, which has become heated to a high degree by passing through the heat absorber 10' and by contact with the heating device 4' as it circulates through the apertures 14 and the reflector 3', will be projected forwardly from the discharge end of the passageway G', and a stream of cooler air will be projected forwardly from the discharge end of the passageway H' in such manner that it acts as a blanket for the highly heated air which prevents the latter from rising abruptly, thus producing a more uniform temperature in the room or compartment into which the heated air is discharged because of the distribution of the highly heated air through a zone of relatively great area.

In the use of the form of the invention illustrated in Figs. 1 and 2, the doors 8 may be moved to open positions and the heating apparatus employed as an ordinary radiant heater, or, as already stated, the doors 8 may be closed, as illustrated in the views referred to. When the latter is the case the heat absorbers 10 are positioned within the air circulating passageway G, and the air passageways extended vertically through said heat-absorbers form continuations of the main air circulating passageway G, and air passing through said passageway G passes vertically through the heat-absorbers 10 as well as by and around same, as indicated by the arrows in Fig. 1.

I claim:

1. An air heater comprising a casing having a displaceable wall portion, a heating device arranged within said casing, a heat-absorber supported by said displaceable wall portion, and a reflector for collecting or gathering together heat waves emanating from said heating device and projecting said heat waves onto said heat-absorber.

2. An air heater comprising a casing having a displaceable wall portion comprising a hinged door, a heating device arranged within said casing, a heat-absorber supported by said displaceable wall portion, and a reflector for collecting or gathering together heat waves emanating from said heating device and projecting said heat waves onto said heat-absorber.

3. An air heater comprising a casing having a displaceable wall portion comprising a plurality of hinged doors, a heating device arranged within said casing, heat-absorbers supported by said displaceable wall portion, and a reflector for collecting or gathering together heat waves emanating from said heating device and projecting said heat waves onto said heat-absorbers.

4. An air heater comprising a casing having a displaceable wall portion, a heating device arranged within said casing, a heat-absorber supported by said displaceable wall portion in spaced relation with respect thereto, and a reflector for collecting or gathering together heat waves emanating from said heating device and projecting said heat waves onto said heat-absorber.

5. An air heater comprising a casing having a displaceable wall portion, a heating device arranged within said casing, a heat-absorber supported by said displaceable wall portion in spaced relation with repect thereto, an air passageway within said casing within which said heat-absorber is disposed when said displaceable wall portion is functioning as a portion of a closed wall, and a reflector for collecting or gathering together heat waves emanating from said heating device, and projecting said heat waves onto said heat-absorber.

6. An air heater provided with an air circulating passageway disposed so as to discharge a stream of heated air into the room or compartment in which the heater is located, a heat-absorber arranged so as to be acted upon by the air circulating through said passageway, a heating device, a reflector for collecting or gathering together heat waves emanating from said device and projecting said heat waves onto said heat-absorber, and a separate and distinct air circulating passageway disposed so as to discharge a stream of cooler air at a point above the outlet of the passageway for the heated air.

7. An air heater provided with a heating device, a heat absorber, a reflector for collecting or gathering together heat waves emanating from said device and projecting the heat waves onto the absorber, an air circulating passageway disposed so that the air admitted to same will be heated by conduction from said heating device and absorber and then discharged in a highly heated condition into the room or compartment in which the heater is located, and a separate and distinct air circulating passageway for cooler air having its outlet arranged in such relation with the outlet of the passageway for the highly heated air that the stream of cooler air discharged from the heater will act as a blanket which tends to prevent abrupt rising of the stream of highly heated air discharged from the heater.

8. An air heater, comprising a casing, a circulating passageway in said casing for hot air, having its outlet so disposed that the air escaping from same will be discharged in a substantially horizontal direction into the room in which the heater is located, a separate passageway in said casing for cooler air, having its outlet arranged above the outlet of the passageway for the hot air, a heat-absorber in the hot air passageway, a heating device, and a reflector for collecting or gathering together heat waves emanating from said device and projecting said heat waves onto the heat-absorber, said reflector being arranged in the passageway for the cooler air and being combined with the hot air passageway in such a manner that some of the air circulating through said hot air passageway will be heated by conduction from contact with the heating device.

9. A heating apparatus, comprising a casing provided with a plurality of air circulating passageways whose outlets terminate in one of the upright walls of said casing, one of said passageways being used to discharge highly heated air and the other passageway being used to discharge coler air that acts as a blanket which tends to prevent abrupt rising of the highly heated air, a heat-absorber arranged in the passageway for the highly heated air, an electrically-operated heating device, and a reflector for collecting or gathering together heat waves emanating from said heating device and projecting said heat waves onto the heat-absorber, said reflector being combined with said passageways in such a manner that some of the air flowing through the hot air passageway will circulate through the interior of said reflector and the air flowing through the other passageway will circulate over the exterior of the reflector.

10. An air heater comprising a casing having a displaceable wall portion, a heating device arranged within said casing, and a heat-absorber supported by said displaceable wall portion.

11. An air heater comprising a casing having a displaceable wall portion and including a main air passageway for heated air and a secondary air passageway for cooler air, heat-absorbing means located in said main air passageway and supported by said displaceable wall portion, and heating means adapted to impart heat to said heat-absorbing means, said secondary air passageway having a discharge opening which is located above the discharge opening of the main air passageway whereby cooler air discharged from the discharge opening of the secondary air passageway will mix with heated air which is discharged from the discharge opening of the main air passageway and prevent same from rising abruptly.

ERNEST F. FISHER.